United States Patent
Fleiger-Holmes et al.

(10) Patent No.: US 9,257,050 B2
(45) Date of Patent: Feb. 9, 2016

(54) AIRPLANE POSITION ASSURANCE MONITOR

(71) Applicant: The Boeing Company, Chicago, IL (US)

(72) Inventors: Steven L. Fleiger-Holmes, Edmonds, WA (US); Timothy Allen Murphy, Everett, WA (US); Jean Marie Crane, Seattle, WA (US)

(73) Assignee: The Boeing Company, Chicago, IL (US)

( * ) Notice: Subject to any disclaimer, the term of this patent is extended or adjusted under 35 U.S.C. 154(b) by 94 days.

(21) Appl. No.: 14/100,245

(22) Filed: Dec. 9, 2013

(65) Prior Publication Data

US 2014/0100720 A1 Apr. 10, 2014

Related U.S. Application Data

(62) Division of application No. 13/085,310, filed on Apr. 12, 2011, now Pat. No. 8,630,756.

(51) Int. Cl.
| | |
|---|---|
| *G05D 1/00* | (2006.01) |
| *G08G 5/02* | (2006.01) |
| *G01S 1/18* | (2006.01) |
| *G01S 19/15* | (2010.01) |
| *G01S 19/20* | (2010.01) |

(Continued)

(52) U.S. Cl.
CPC ... *G08G 5/02* (2013.01); *B64D 43/00* (2013.01); *B64D 45/04* (2013.01); *G01C 5/005* (2013.01); *G01S 1/18* (2013.01); *G01S 19/15* (2013.01); *G01S 19/20* (2013.01)

(58) Field of Classification Search
CPC ..... G05G 5/025; G05G 5/065; G05G 5/0021; G05G 5/0013; G05G 5/0008; G05G 5/0026; G05G 5/0078; G05G 5/045; G05G 5/0082; G05G 5/0086; G10S 19/48; G10S 1/047; G10S 1/14; G10S 1/18; G10S 5/009; G10S 7/003; G10S 11/02; G10S 13/28; G10S 13/42; G10S 13/4418; G10S 13/4427
USPC ........ 701/16, 301, 120, 117, 14, 18; 340/969, 340/965, 975, 977, 981
See application file for complete search history.

(56) References Cited

U.S. PATENT DOCUMENTS 3,644,722 A * 2/1972 Hobbs et al. ............ 701/4
4,316,252 A   2/1982 Cooper (Continued)

OTHER PUBLICATIONS

Extended European Search Report, Jul. 30, 2013, European Application No. 12163993.4.

*Primary Examiner* — Truc M Do
(74) *Attorney, Agent, or Firm* — Ostrager Chong Flaherty & Broitman P.C.

(57) ABSTRACT

An onboard monitor that ensures the accuracy of data representing the calculated position of an airplane during final approach to a runway. This airplane position assurance monitor is a software function that uses dissimilar sources of airplane position and runway data to ensure the accuracy of the respective data from those dissimilar sources. ILS data and GPS or GPS/Baro data are the dissimilar sources of airplane position data used by this function. This function will calculate the airplane's angular deviations from the runway centerline and from the glide slope with onboard equipment and then compare those angular deviations to the ILS angular deviation information.

16 Claims, 5 Drawing Sheets

(51) Int. Cl.
  *B64D 43/00*  (2006.01)
  *B64D 45/04*  (2006.01)
  *G01C 5/00*  (2006.01)

(56) References Cited

U.S. PATENT DOCUMENTS

| | | | |
|---|---|---|---|
| 5,014,053 A | 5/1991 | Nguyen | |
| 5,361,212 A | 11/1994 | Class et al. | |
| 5,600,329 A * | 2/1997 | Brenner | 342/357.44 |
| 6,239,745 B1 * | 5/2001 | Stratton | 342/410 |
| 6,342,853 B1 * | 1/2002 | Kalafus et al. | 342/357.31 |
| 6,711,479 B1 | 3/2004 | Staggs | |
| 7,089,092 B1 | 8/2006 | Wood et al. | |
| 7,337,063 B1 * | 2/2008 | Oberg et al. | 701/469 |
| 7,546,183 B1 | 6/2009 | Marcum | |
| 7,619,556 B1 | 11/2009 | McCusker | |
| 7,787,998 B2 | 8/2010 | Foucart et al. | |
| 2002/0040263 A1 | 4/2002 | Johnson et al. | |
| 2004/0167685 A1 * | 8/2004 | Ryan et al. | 701/16 |
| 2007/0032924 A1 * | 2/2007 | Foucart et al. | 701/13 |
| 2007/0106433 A1 * | 5/2007 | He | 701/16 |
| 2008/0103644 A1 * | 5/2008 | Oberg et al. | 701/8 |
| 2008/0297397 A1 | 12/2008 | Oberg | |

\* cited by examiner

AIRPLANE POSITION ASSURANCE MONITOR

RELATED PATENT APPLICATION

This application is a divisional of and claims priority from U.S. patent application Ser. No. 13/085,310 filed on Apr. 12, 2011.

BACKGROUND

The invention generally relates to systems and methods for validating the instrument landing system positioning information of an airplane conducting a precision approach to a runway.

An instrument landing system (ILS) is a ground-based instrument approach system that provides precision guidance to an aircraft approaching and landing on a runway, using a combination of radio signals and, in many cases, high-intensity lighting arrays to enable a safe landing during instrument meteorological conditions, such as low ceilings or reduced visibility due to fog, rain, or snow.

Instrument approach procedure charts (or approach plates) are published for each ILS approach, providing pilots with the needed information to fly an ILS approach during instrument flight rules operations, including the radio frequencies used by the ILS components and the minimum visibility requirements prescribed for the specific approach.

An ILS includes ground-based transmitters, located at runways, and airborne receivers. The ILS transmitters transmit signals, received by the receivers on the aircraft, which are utilized to align an aircraft's approach to a runway. Typically, an ILS consists of two portions, a localizer portion and a glide slope portion. The localizer portion is utilized to provide lateral guidance and includes a localizer transmitter located at the far end of the runway. The glide slope portion provides vertical guidance to a runway and includes a glide slope transmitter located at the approach end of the runway. Aircraft guidance is provided by the ILS receivers in the aircraft by performing a modulation depth comparison.

More specifically, a localizer (LOC) antenna array is normally located beyond the departure end of the runway and generally consists of several pairs of directional antennas. Two signals are transmitted at a carrier frequency. One is modulated at 90 Hz; the other at 150 Hz. These modulated signals are transmitted from separate but co-located antennas. Each antenna transmits a narrow beam, one slightly to the left of the runway centerline, the other to the right.

The localizer receiver on the aircraft measures the difference in the depth of modulation (DDM) of the 90 and 150 Hz modulated signals. For the localizer, the depth of modulation for each of the modulating frequencies is 20 percent. The difference between the two signals varies depending on the deviation of the approaching aircraft from the centerline. If there is a predominance of either modulated signal, the aircraft is off the centerline. In the cockpit, the needle on a horizontal situation or course deviation indicator will show that the aircraft needs to fly left or right to correct the error to fly down the center of the runway. If the DDM is zero, the aircraft is on the centerline of the localizer coinciding with the physical runway centerline.

A glide slope (GS) antenna array is sited to one side of the runway touchdown zone. The GS signal is transmitted on a carrier frequency using a technique similar to that of the localizer. The centerline of the glide slope signal is arranged to define a glide slope of approximately 3° above horizontal (ground level). The beam is 1.4° deep; 0.7° below the glideslope centerline and 0.7° above the glideslope centerline.

The localizer and glide slope both provide an angular deviation from a desired flight path. The angular deviation is the angle between the current flight path and the desired flight path.

The pilot controls the aircraft so that the indications on the course deviation indicator remain centered on the display. This ensures the aircraft is following the ILS centerline (i.e., it provides lateral guidance). Vertical guidance, shown on the instrument by the glideslope indicator, aids the pilot in reaching the runway at the proper touchdown point. Many aircraft possess the ability to route signals into the autopilot, allowing the approach to be flown automatically by the autopilot.

The output from the ILS receiver goes both to the display system (head-down display and head-up display, if installed) and can also go to the flight control computer. An aircraft landing procedure can be either "coupled," where the flight control computer directly flies the aircraft and the flight crew monitor the operation; or "uncoupled" (manual), where the flight crew fly the aircraft using the primary flight display and manually control the aircraft to minimize the deviation from flight path to the runway centerline.

There are three categories of ILS which support similarly named categories of operation.

Category I (CAT I)—A precision instrument approach and landing with a decision height not lower than 200 ft above touchdown zone elevation and with either a visibility not less than 2,625 ft or a runway visual range (RVR) not less than 1,804 ft.

Category II (CAT II)—A precision instrument approach and landing with a decision height lower than 200 ft above touchdown zone elevation but not lower than 100 ft, and a RVR not less than 984 ft for aircraft approach category A, B, C and not less than 1,148 ft for aircraft approach category D.

Category III (CAT III) is subdivided into three sections:

Category III A—A precision instrument approach and landing with: (a) a decision height lower than 100 ft above touchdown zone elevation, or no decision height (alert height); and (b) a RVR not less than 656 ft.

Category III B—A precision instrument approach and landing with: (a) a decision height lower than 50 ft above touchdown zone elevation, or no decision height (alert height); and (b) a RVR in the range 246-656 ft.

Category III C—A precision instrument approach and landing with no decision height and no RVR limitations.

Runway Visual Range (RVR) is a term used in aviation meteorology to define the distance over which a pilot of an aircraft on the centerline of the runway can see the runway surface markings delineating the runway or identifying its centre line.

RVR is used as one of the main criteria for minima on instrument approaches, as in most cases a pilot must obtain visual reference of the runway to land an aircraft. RVRs are transmitted by air traffic controllers to aircraft making approaches to allow pilots to assess whether it is prudent and legal to make an approach.

An ILS is required to shut down upon internal detection of a fault condition. With the increasing categories, ILS equipment is required to shut down faster, since higher categories require shorter response times. For example, a CAT I localizer must shutdown within 6 seconds of detecting a fault, but a CAT III localizer must shut down in less than 2 seconds.

When conducting an ILS approach, the airplane uses radio signals from the ILS system for guidance. The higher-class ILS systems have more protections and monitoring in place to ensure that radio signals are not interfered with and internal errors do not cause the guidance to fall out of required accuracy tolerances. This increases the cost of installing and maintaining the ILS systems and is one reason why there are relatively few CAT II and CAT III runways. ILS approaches currently account for the majority of precision approaches at runways around the world. Of these, only about 8% of all ILS systems support CAT II or CAT III operations.

There is a need for a system and method for increasing the positioning assurance of a Type I ILS system, so that the number of runways that support CAT II operations could be increased significantly.

SUMMARY

Disclosed herein is an onboard monitor that ensures the accuracy of data representing the calculated position of an airplane during final approach to a runway. This airplane position assurance monitor is a software function that uses dissimilar sources of airplane position and runway data to ensure the accuracy of the respective data from those dissimilar sources. ILS data and GPS latitude/longitude and GPS or barometric altitude data are the dissimilar sources of airplane position data used by this function. This function will determine the airplane's angular deviations from the runway centerline, with an origin at the location of the localizer antenna and a vertical deviation measured as an angle from the glide slope reference cone with onboard equipment and then compares those angular deviations to the ILS angular deviation information.

The monitor utilizes dissimilar sources of airplane positioning data and trigonometry mathematics to continuously monitor and compare the airplane's position during the approach phase of flight. If one of the sources of position data loses accuracy, it will be detected when compared to the other source of position data.

This new function provides a method of increasing the positioning assurance of a Type I ILS system. This may enable an airplane to conduct a CAT II approach to a runway that would otherwise only support a CAT I approach. The disclosed monitor could facilitate CAT II operational approval of a reduction in the RVR limit down to 1,200 ft with a decision height of 100 ft. By increasing the positioning assurance of a Type 1 ILS system, the number of runways that support CAT II operations could be increased significantly.

One aspect of the subject matter disclosed in detail hereinafter is a method for monitoring positional accuracy of an airplane approaching a runway. The method comprises the following steps performed by a computer system during the approach: (a) determining a ground distance between a location of the airplane and a touchdown aim point on the runway based on respective coordinates thereof; (b) determining a height of the airplane above a threshold of the runway based on an altitude of the airplane and an elevation of a threshold of the runway; (c) determining an angle between a hypothetical line extending from the airplane to the touchdown aim point and the perpendicular projection of that line on the local level plane that passes through the threshold reference point based on the ground distance and the height; (d) determining a first vertical angular deviation of the airplane from a glideslope based on a difference of the determined angle and a glide path angle; (e) receiving a second vertical angular deviation of the airplane from the glideslope based on measurements of a difference in the depth of modulation of first and second modulated signals transmitted from a ground-based antenna and received by an antenna onboard the airplane; (f) comparing the first and second vertical angular deviations; and (g) generating an alert signal if the first and second vertical angular deviations differ by an amount greater than a threshold value.

Another aspect is a system for monitoring positional accuracy of an airplane approaching a runway, comprising: a glideslope receiver for determining a first vertical angular deviation of the airplane from the glide slope based on measurements of a difference in the depth of modulation of first and second modulated signals transmitted by a ground-based glide slope transmitter; and a computer system that is programmed to perform the following operations during the approach: (a) determining a ground distance between a location of the airplane and a touchdown aim point on the runway based on respective coordinates thereof; (b) determining a height of the airplane above a threshold of the runway based on an altitude of the airplane and an elevation of a threshold of the runway; (c) determining an angle between a hypothetical line extending from the airplane to the touchdown aim point and the perpendicular projection of that line on the local horizontal plane that passes through the threshold reference point based on the ground distance and the height; (d) determining a second vertical angular deviation of the airplane from a glideslope based on the computed angle and a glide path angle; (e) comparing the first and second vertical angular deviations; and (f) generating an alert signal if the first and second vertical angular deviations differ by an amount greater than a threshold value.

A further aspect is a method for monitoring positional accuracy of an airplane approaching a runway. The method comprises the following steps performed by a computer system during the approach: (a) calculating a ground distance between a location of the airplane and a touchdown aim point on the runway based on respective coordinates thereof and not using vertical angular deviation; (b) calculating a height of the airplane above a threshold of the runway based on an altitude of the airplane and an elevation of a threshold of the runway and not using vertical angular deviation; (c) calculating an angle between a hypothetical line extending from the airplane to the touchdown aim point and a perpendicular projection of that line onto the locally level plane that passes through the runway threshold reference point based on the ground distance and the height and not using vertical angular deviation; (d) calculating a first vertical angular deviation of the airplane from a glideslope based on a difference of the calculated angle and a glide path angle; (e) calculating a second vertical angular deviation of the airplane from the glideslope based on measurements of a difference in the depth of modulation of first and second modulated signals transmitted from a ground-based antenna and received by an antenna onboard the airplane; (f) comparing the first and second vertical angular deviations; and (g) generating an alert signal if the first and second vertical angular deviations differ by an amount greater than a threshold value.

Other aspects of the invention are disclosed and claimed below.

BRIEF DESCRIPTION OF THE DRAWINGS

Reference will hereinafter be made to the drawings in which similar elements in different drawings bear the same reference numerals.

DETAILED DESCRIPTION

An airborne vehicle can be located using different well-known systems. For example, the onboard navigation system may use GPS signals to determine latitude/longitude coordinates and may use GPS signals or an output signal from a pressure altimeter to determine airplane altitude. It is well known to translate a vehicle position from latitude/longitude/altitude to the Earth Centered Earth Fixed (ECEF) reference frame. The ECEF coordinate system represents positions using X, Y and Z coordinates. The point (0,0,0) is defined as the center of mass of the Earth. The axes of the ECEF coordinate system are aligned with the International Reference Pole and International Reference Meridian, which are fixed with respect to the surface of the Earth. The ECEF frame of reference rotates with the Earth. The embodiments disclosed herein use the ECEF coordinate system. In the alternative, other coordinate systems could be utilized.

Various embodiments of an airplane position assurance monitor will now be disclosed. The monitor comprises one or more computers or processors programmed with software for executing algorithms that calculate the airplane's angular deviations from the runway centerline and from the glide slope with onboard equipment and then compares those angular deviations to the ILS angular deviation information.

Figure 1:
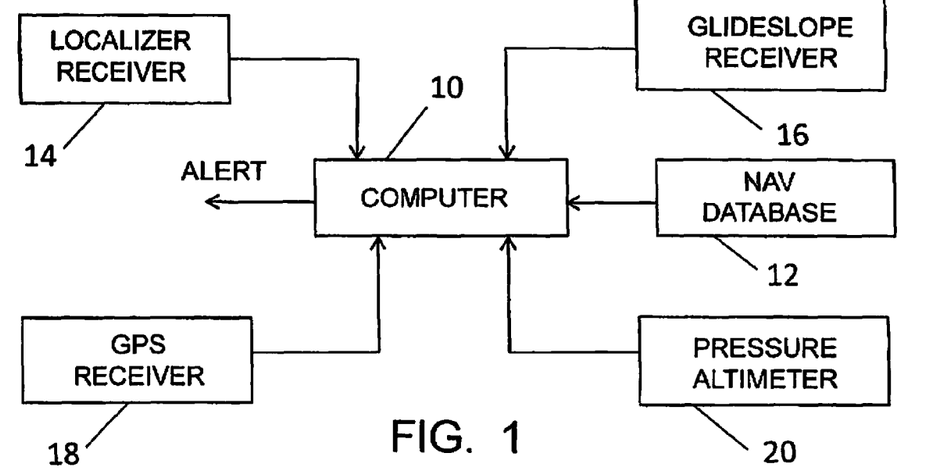
FIG. 1 is a block diagram showing some components of an airplane position assurance monitor in accordance with one embodiment of the invention.

Referring to FIG. 1, the monitor in accordance with one embodiment comprises a computer system 10 that receives data from a multiplicity of sources. The computer system 10 comprises at least one computer or processor, and may have two or more interconnected computers or processors. The received data includes the following: runway, localizer transmitter and glide slope transmitter positional data retrieved from a navigation database 12; difference in depth of modulation data received from a localizer receiver 14; difference in depth of modulation data received from a glideslope receiver 16; airplane positional data received from a GPS receiver 18; and barometric altitude data received from a pressure altimeter 20. Optionally, instead of using the barometric altitude from the pressure altimeter 20, the altitude can be derived from GPS signals received by the GPS receiver 18.

The computer system 10 is programmed with software for executing an algorithm that calculates the airplane's angular deviation from the runway centerline reference plane in a way that does not use the ILS (e.g., using data from the navigation database 12 and data from the GPS receiver 18) and then compares the calculated angular deviation with the angular deviation outputted by the ILS. If the difference between these angular deviations is greater than a first threshold value, an alert signal is generated.

Similarly, the computer system 10 is programmed with software for executing an algorithm that calculates the airplane's angular deviation from the conical glide slope reference surface in a way that does not use the ILS (e.g., using data from the navigation database 12, data from the GPS receiver 18 and, optionally, data from the pressure altimeter 20) and then compares the calculated angular deviation with the angular deviation outputted by the ILS. If the difference between these angular deviations is greater than a second threshold value, an alert signal is generated. The first and second threshold values may be the same or different.

In response to the generation of an alert signal, an event flag can be set. The system depicted in FIG. 1 may further comprise a device that produces an audible or visible warning in response to generation of the alert signal. For example, a visible warning could be displayed on a cockpit display screen.

Figure 2:
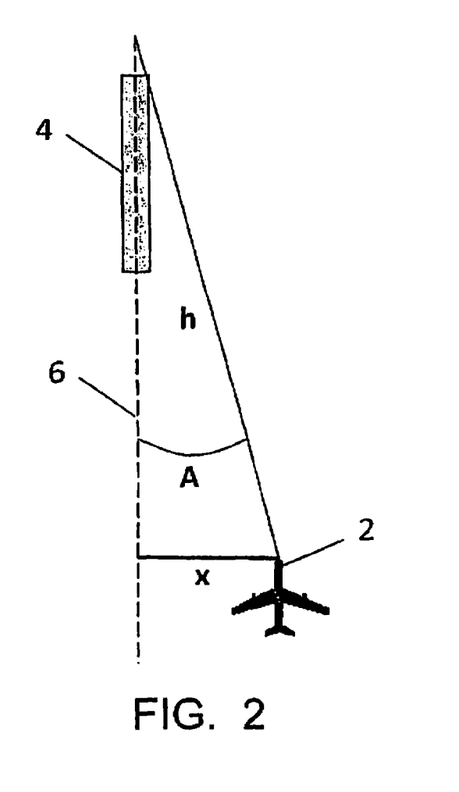
FIG. 2 is a diagram showing the lateral angular deviation from the runway centerline for an approaching airplane.

One methodology for calculating the airplane's angular deviation from the runway centerline reference plane in a way that does not use the ILS will now be described with reference to FIG. 2, which shows an airplane 2 that is approaching a runway 4 along a path not in alignment with the runway centerline 6.

First, the computer system retrieves the following information from the navigation database: data representing the latitude and longitude of the runway threshold; data representing the runway heading; and data representing the length of the runway. In addition, the rules of placing the localizer are known so data representing the latitude and longitude of the position of the localizer transmitter using information about the runway that is in the navigation database. The computer system also receives GPS signals from the GPS receiver and processes those signal in a well-known manner to determine the longitude and latitude of the airplane's current position. The computer system then calculates x, which represents the distance from the airplane 2 to the point on lateral reference plane which bisects the runway and includes the extended runway centerline 6 which is closest to the airplane location. Given the latitudinal and longitudinal coordinates of the airplane and the lateral reference surface location closest thereto, the distance x can be calculated in a well-known manner. Similarly, the distance h from the airplane 2 to the location of the ILS localizer transmitter (i.e., an antenna array) can also be calculated based on their respective coordinates. [The location of the ILS localizer transmitter is represented in FIG. 2 by the vertex where the solid line labeled h intersects the dashed line representing the extended runway centerline 6.] If one were to assume that the Earth is a flat plane the angular deviation A from the runway centerline would be calculated from the following formula:

$$A = \arcsin(x/h)$$

Later in this disclosure, detailed engineering equations will be given assuming an ellipsoidal planet instead of a flat plane.

The computed lateral angular deviation is then scaled the same and in the same units as the lateral angular deviation provided by the onboard localizer receiver. The GPS-derived lateral angular deviation A can then be directly compared to the ILS lateral angular deviation provided by the localizer receiver. An alert signal is generated in response to the difference between the respective lateral angular deviations being greater than a first threshold value.

Figure 3:
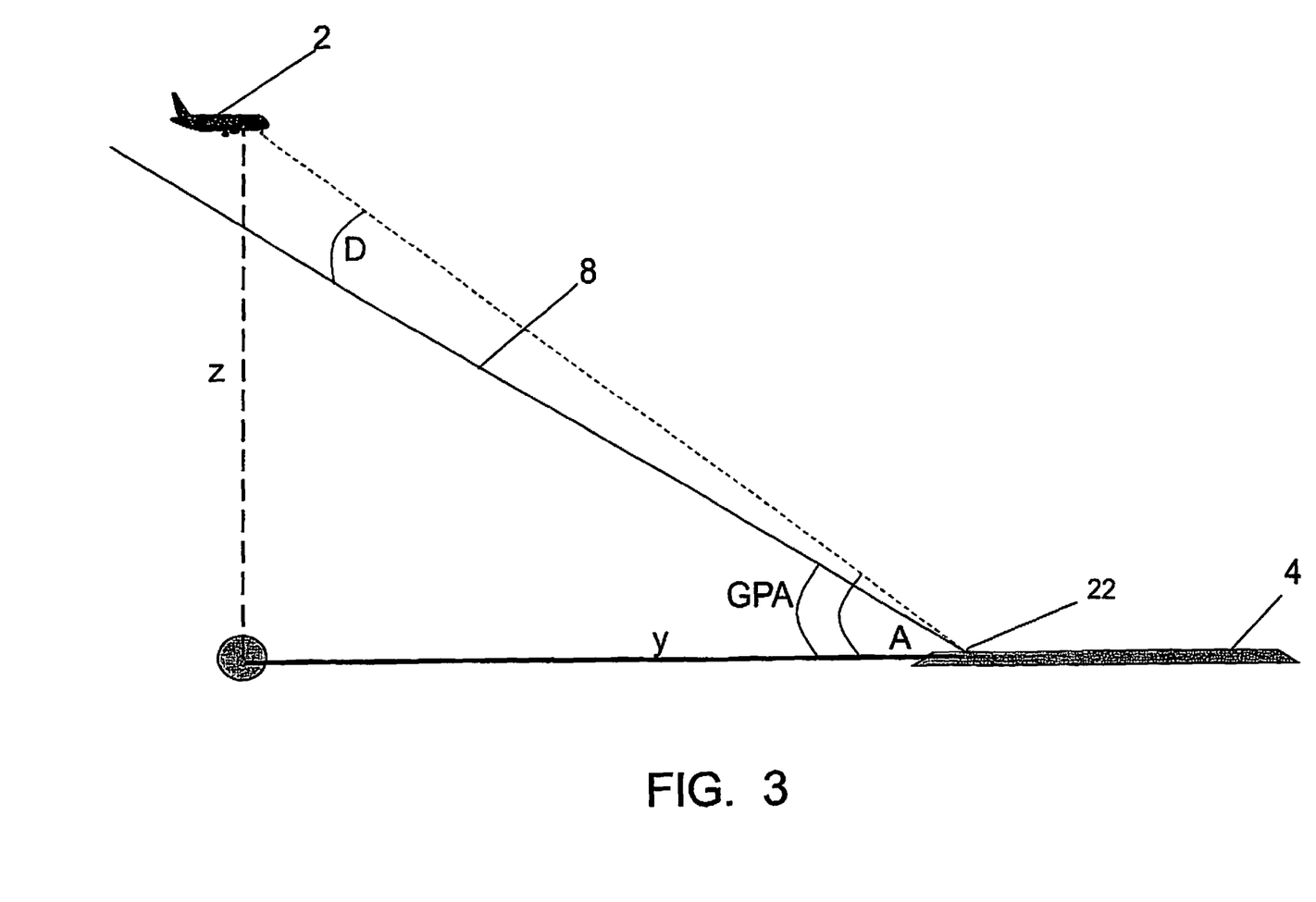
FIG. 3 is a diagram showing the vertical angular deviation from the glide slope for an approaching airplane.

One methodology for calculating the airplane's angular deviation from the glide slope in a way that does not use the ILS will now be described with reference to FIG. 3, which shows an airplane 2 that is approaching a runway 4 along a path not in alignment with the glide slope 8.

First, the computer system retrieves the following information from the navigation database: data representing the threshold crossing height (TCH); data representing the elevation of the runway threshold; data representing the runway heading; and data representing the glide path angle (GAP). The computer system also receives GPS signals from the GPS receiver and processes those signal in a well-known manner to determine the longitude and latitude of the airplane's current position. The computer system then uses the runway heading, TCH and GPA to determine the latitudinal and longitudinal coordinates of the touchdown aim point [also known as the glide path intercept point (GPIP)]. Then the computer system calculates y, which represents the distance from the projection of the position of the airplane 2 onto the local level plane to the touchdown aim point. Given the latitudinal and longitudinal coordinates of the airplane and the touchdown aim point, the distance y can be calculated in a well-known manner. In accordance with this embodiment, the computer system also receives data from the pressure altimeter representing the current barometric altitude of the airplane. The computer system subtracts the runway threshold elevation from the current barometric altitude to obtain z, which is the height of the airplane above the level of the runway threshold. Again assuming that the Earth were a flat plane, the angle A, which represents the angle of the airplane's current flight path relative to the local level plane, would be calculated from the following formula:

$$A = \arctan(z/y)$$

The vertical angular deviation D could then be calculated using the following formula:

$$D = A - GPA$$

Again, however, more precise equations will be given hereinafter assuming an ellipsoidal planet instead of a flat plane.

The computed vertical angular deviation is then scaled the same and in the same units as the vertical angular deviation provided by the onboard glide slope receiver. The GPS/baro-derived vertical angular deviation D can then be directly compared to the ILS vertical angular deviation provided by the glide slope receiver. An alert signal is generated in response to the difference between the respective vertical angular deviations being greater than a second threshold value.

It should be appreciated that the airplane altitude used in the computations can be derived from GPS signals instead being measured by a pressure altimeter.

Figure 4:
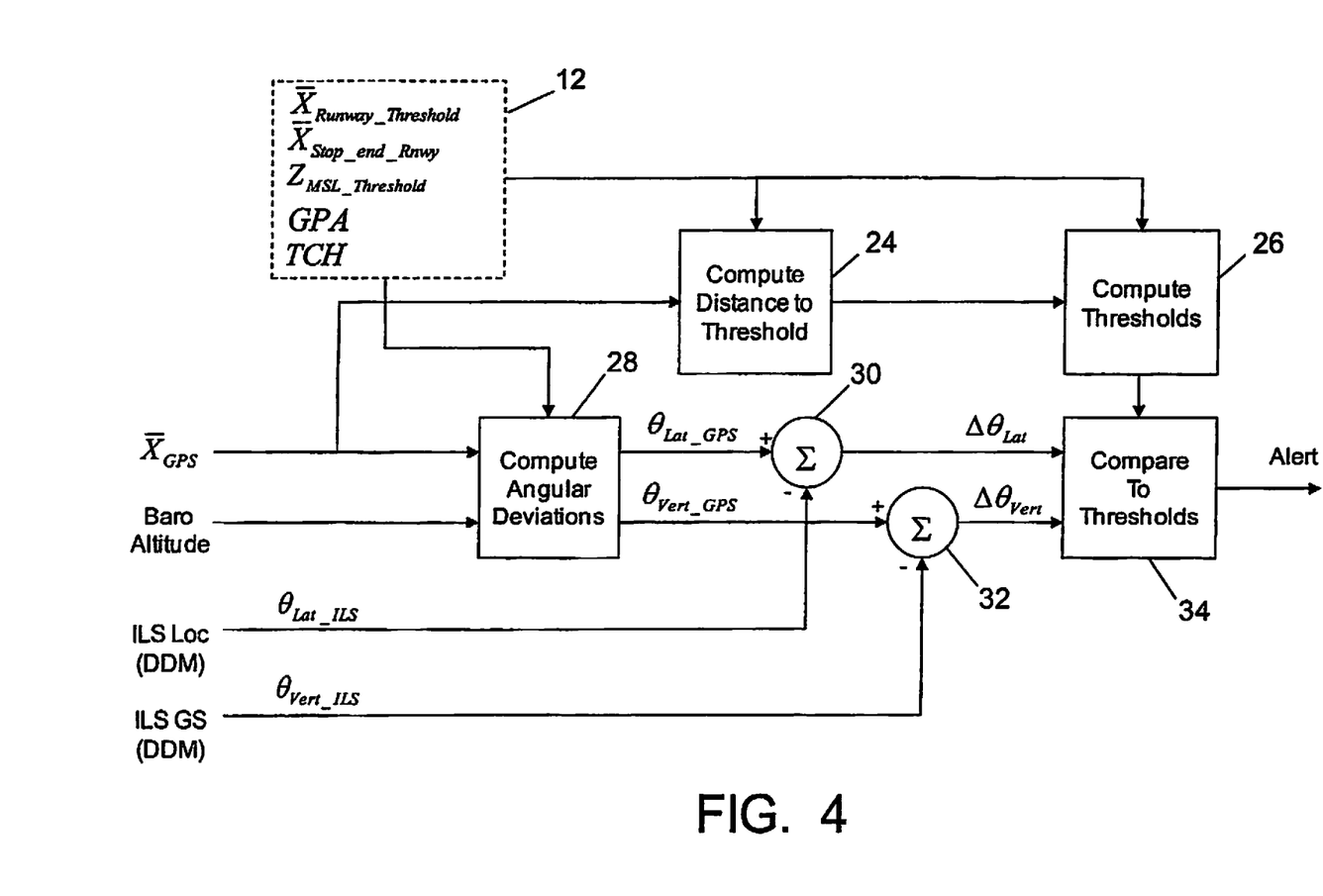
FIG. 4 is a block flow diagram showing operations performed by the airplane position assurance monitor depicted in FIG. 1.

FIG. 4 is a block flow diagram summarizing the operations described with reference to FIGS. 2 and 3, and also indicating additional steps. The lateral and vertical angular deviations are calculated without using the ILS, as indicated by module 28 in FIG. 4. As described above, these non-ILS-derived angular deviations are computed based on the GPS-derived latitude/longitude of the airplane ($\overline{X}_{GPS}$), the barometric (or GPS) altitude, and the following information retrieved from the navigation database 12: the TCH, the GPA, the latitude/longitude of the runway threshold ($\overline{X}_{Runway\_Threshold}$), the latitude/longitude of the end of the runway ($\overline{X}_{Stop\_End\_Runway}$), and the elevation of the runway threshold relative to mean sea level ($Z_{MSL\_Threshold}$). The outputs of module 8 are the non-ILS-derived lateral angular deviation $\theta_{Lat\_GPS}$ and the non-ILS-derived vertical angular deviation $\theta_{Vert\_GPS}$. The summer 30 receives $\theta_{Lat\_GPS}$ from block 28 and the ILS-derived lateral angular deviation $\theta_{Lat\_ILS}$ from the onboard localizer receiver (not shown in FIG. 4), and outputs a difference $\Delta\theta_{Lat} = \theta_{Lat\_GPS} - \theta_{Lat\_ILS}$ to module 34. Similarly, the summer 32 receives $\theta_{Vert\_GPS}$ from block 28 and the ILS-derived vertical angular deviation $\theta_{Vert\_ILS}$ from the onboard localizer receiver (not shown in FIG. 4), and outputs a difference $\Delta\theta_{Vert} = \theta_{Vert\_GPS} - \theta_{Vert\_ILS}$ to module 34. Module 34 then compares $\Delta\theta_{Lat}$ and $\Delta\theta_{Vert}$ to respective thresholds provided by module 26. The module 26 computes the respective thresholds based at least in part on information retrieved from the navigation database 12 and the distance of the airplane from the runway threshold. The latter parameter is computed by module 24 in a well-known manner using the respective positions of the airplane ($\overline{X}_{GPS}$) and the runway threshold ($\overline{X}_{Runway\_Threshold}$).

The lateral and vertical angular deviations are computed relative to a Final Approach Segment (FAS), which is the segment of an instrument approach procedure in which the alignment and descent for landing are accomplished. In the case of a precision approach e.g., ILS), the final approach segment begins at the final approach point. This is a point in space on the centerline of the localizer. Computation of angular deviations relative to the FAS can be done in a variety of ways. Proper computation of the FAS should be consistent with the relationships described in FIG. 5. The FAS is defined uniquely by the Landing Threshold Point (LTP), the Flight Path Alignment Point (FPAP), the Glide Path Angle (GPA) and the Threshold Crossing Height (TCH), which are retrieved from the navigation database. The FAS defines a coordinate system fixed to the runway. The following example shows one way that the FAS can be computed.

Figure 5:
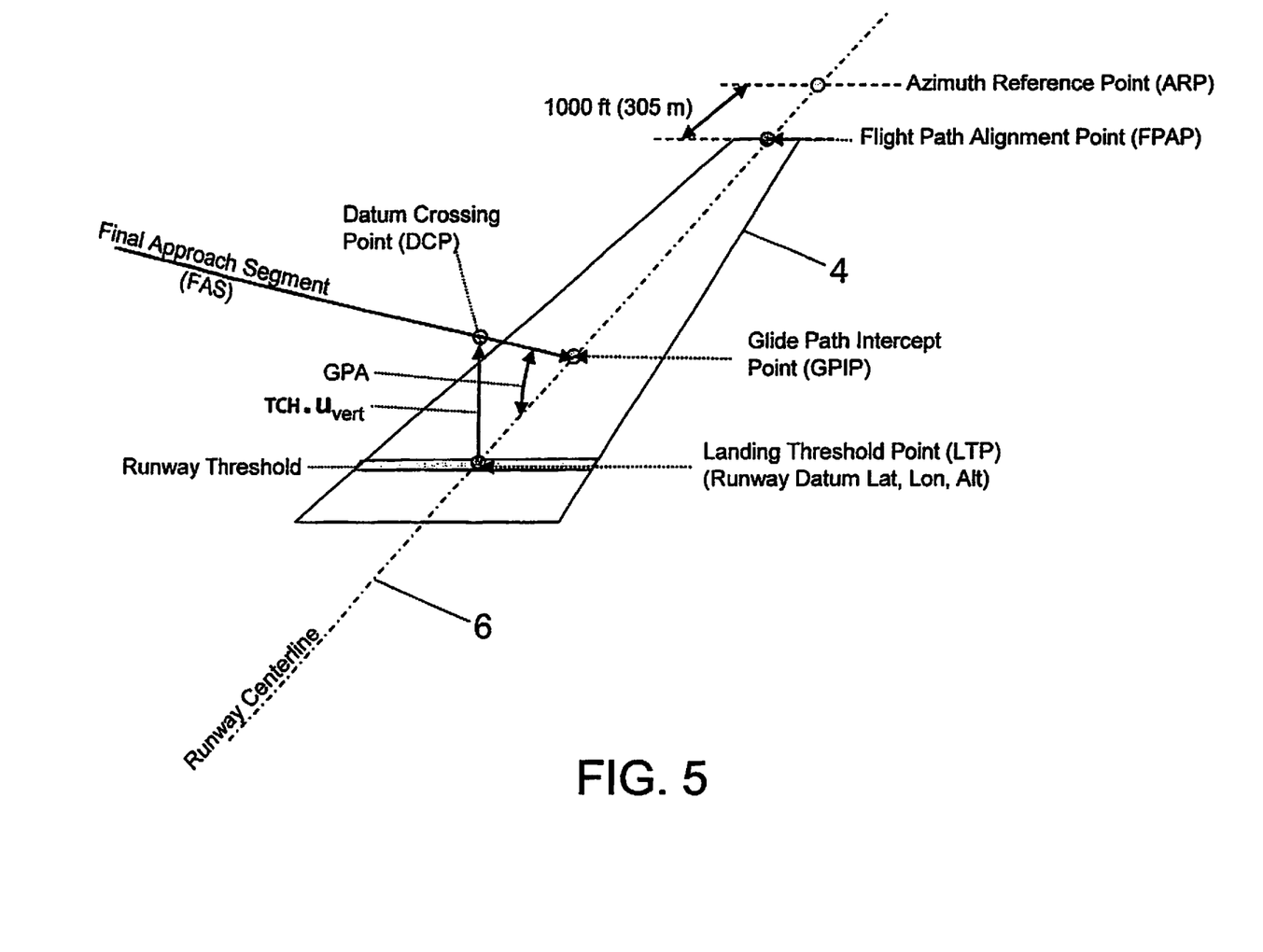
FIG. 5 is a diagram showing the relationships used in computation of a Final Approach Segment.

Referring to FIG. 5, first the LTP and FPAP should be transformed to WGS84 ECEF Cartesian coordinates. The position in Latitude, Longitude and Altitude can be translated to Earth Centered Earth Fixed (ECEF) reference frame using the algorithm given in Appendix A.

Define $r_{LTP}^{ECEF}$ to be the vector from the center of the Earth to the LTP expressed in WGS84 ECEF Cartesian coordinates. The vertical unit vector $u_{vert}$ is defined to be the normal to the WGS 84 ellipsoid at the LTP. The vector $u_{vert}$ can be computed by:

$$u_{vert} = \begin{bmatrix} \frac{(1-e^2)r_{LTP}^{ECEF}(1)}{r_{LTP}^{ECEF}(3)} \\ \frac{(1-e^2)r_{LTP}^{ECEF}(2)}{r_{LTP}^{ECEF}(3)} \\ 1 \end{bmatrix} \cdot \frac{-1}{\sqrt{\left(\frac{(1-e^2)r_{LTP}^{ECEF}(1)}{r_{LTP}^{ECEF}(3)}\right)^2 + \left(\frac{(1-e^2)r_{LTP}^{ECEF}(2)}{r_{LTP}^{ECEF}(3)}\right)^2 + 1}} \quad (1)$$

where $e^2 = 6.694379991013 \times 10^{-3}$ is the square of the WGS-84 first eccentricity. [Note: Although Eq. (1) gives the true normal to the WGS 84 ellipsoid, it has the problem that it "blows up at the equator". As long as the LTP is never precisely on the equator, this should not be a problem.]

Define $r_{FPAP}^{ECEF}$ to be a vector from the center of the Earth to the FPAP in WGS84 ECEF Cartesian coordinates. The ellipsoidal height of the FPAP is defined to be the same as the ellipsoidal height of the LTP for simplicity. Since only the latitude and longitude of the FPAP are needed to define the plane bisecting the runway, any point on the line defined by that latitude and longitude could be used for the height.

A flight path alignment unit vector which points from the LTP to the FPAP may now be computed:

$$u_{FPA} = \frac{r_{FPAP}^{ECEF} - r_{LTP}^{ECEF}}{|r_{FPAP}^{ECEF} - r_{LTP}^{ECEF}|} \quad (2)$$

A unit vector in the lateral direction can also be computed:

$$u_{lat} = \frac{u_{vert} \times u_{FPA}}{|u_{vert} \times u_{FPA}|} \quad (3)$$

A unit vector in the longitudinal direction can likewise be computed:

$$u_{rw} = u_{lat} \times u_{vert} \quad (4)$$

Note that both $u_{lat}$ and $u_{rw}$ in a locally level plane. The vectors $u_{rw}$ and $u_{vert}$ define a plane which bisects the runway. This is the reference plane for the lateral deviations.

The glide path intercept point (GPIP) is defined to be the point where the FAS intersects the local level plane which passes through the LTP. (The locally level plane is defined as the plane which is orthogonal to $u_{vert}$ and includes the point $r_{LTP}^{ECEF}$. The GPIP can be computed by:

$$r_{GPIP}^{ECEF} = r_{LTP}^{ECEF} + u_{rw} \cdot \frac{TCH}{\tan(GPA)} \quad (5)$$

where GPA is the glide path angle, defined to be the angle of the FAS relative to the locally level plane (Note: the GPIP may not correspond to the location that the FAS intersects the actual runway surface. If the runway is humped, the GPIP may be below the runway surface); and TCH is the Threshold Crossing Height, defined as the distance above the LTP where the FAS crosses over the LTP. That point is defined as the Datum Crossing Point.

The Datum Crossing Point $r_{DCP}^{ECEF}$ is given by:

$$r_{DCP}^{ECEF} = r_{LTP}^{ECEF} - u_{vert} \cdot TCH \quad (6)$$

The along track direction, $u_{long}$, is defined by a vector which points "up" the glide path. The unit vector along the glide path is computed by:

$$u_{long} = \frac{r_{DCP}^{ECEF} - r_{GPIP}^{ECEF}}{|r_{DCP}^{ECEF} - r_{GPIP}^{ECEF}|} \quad (7)$$

The vertical cross track direction is defined by a unit vector $u_{GS}$ which is orthogonal to the FAS and lies in the plane defined by the FAS and $u_{vert}$. A unit vector in the vertical cross track direction is computed by:

$$u_{GS} = u_{lat} \times u_{long} \quad (8)$$

Figure 6:
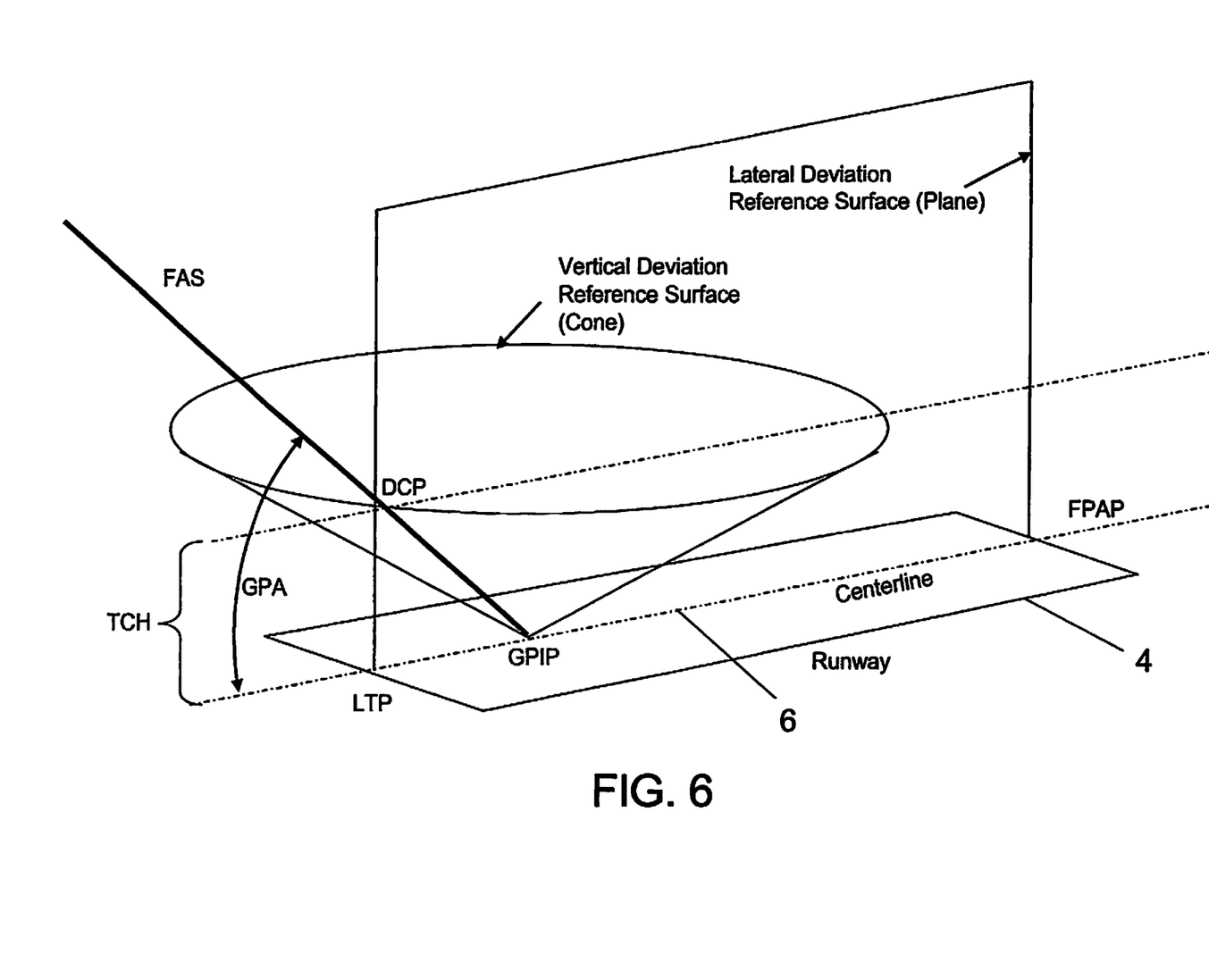
FIG. 6 is a diagram showing reference surfaces for computation of lateral and vertical angular deviations.

In accordance with one embodiment, the airplane position assurance monitor uses an algorithm to compute deviations relative to a desired flight path defined by the FAS. The FAS defines a line which is actually the intersection of two surfaces. The deviation outputs are computed separately for the vertical and lateral using these two surfaces. For the lateral deviations, the reference surface is a plane that bisects the runway. The plane is defined unambiguously by $u_{rw}$ and $u_{vert}$. For the vertical deviations, the reference surface is a cone where the apex of the cone is at the GPIP as illustrated in FIG. 6. The deviations are computed by projecting the current position expressed in a local coordinate system on the vertical and lateral cross track directions.

The lateral and vertical cross track deviations are related to the FAS and are independent of the origin of the local coordinate frame. However, computation of the deviations requires that a coordinate frame be used. Furthermore, if angular deviations are to be produced, the angles must be computed with respect to an origin.

One possible method of determining the vertical and lateral cross track deviations is given below. The deviations must be computed for some point on the airplane. For that purpose we define the Guidance Control Point (GCP). Since the ultimate goal of the airplane position assurance monitor is to compare an observed deviation from ILS with a calculated deviation from GPS and FAS data, the calculated deviations must be referenced to the same point on the airplane that the ILS deviation is observed. Therefore the GPS position must be translated from the GPS antenna location to a GCP which is coincident with the ILS glide slope (GS) antenna. This translation requires use of pitch, roll and heading information from the inertial system and that the lever arm (i.e., distance between the phase centers) between the GPS antenna(s) and the GA antenna be known. The instantaneous position of the GCP is used in the calculations of the deviations. Define the vector between the measured position of the GCP and the GPIP as:

$$dr_{GS} = r_{GCP}^{ECEF} - r_{GPIP}^{ECEF} \quad (9)$$

The range to GPIP is computed by:

$$r_{GS} = |dr_{GS}| \quad (10)$$

The desired user position is the projection of the GCP onto the FAS. The projection of the GCP onto the FAS is:

$$r_{desired}^{ECEF} = r_{GPIP}^{ECEF} + u_{long} \cdot dr_{GS} \quad (11)$$

The deviation from the FAS in ECEF coordinates is:

$$d_{dev}^{ECEF} = r_{GCP}^{ECEF} - r_{desired}^{ECEF} \quad (12)$$

The lateral and vertical deviations are the projections of $d_{dev}^{ECEF}$ in the lateral and cross track directions. (Note: a sign convention conforming with ILS is used here.)

$$d_{lat} = -u_{lat} \cdot d_{dev}^{ECEF} \text{ (positive to the left } (-y)) \quad (13)$$

$$d_{GS} = -u_{GS} \cdot d_{dev}^{ECEF} \text{ (positive in up direction } (-z)) \quad (14)$$

To compute the lateral deviations in angular form, the reference is assumed to be the Azimuth Reference Point (ARP). The ARP can be computed from the LIP by:

$$r_{ARP}^{ECEF} = (r_{FPAP}^{ECEF} - r_{LTP}^{ECEF}) \cdot u_{rw} + 305 \cdot u_{rw} \quad (15)$$

where 305 is assumed to be the distance (approximately 1000 ft) from the FPAP to the location of the ILS localizer. (Note: the assumption is that the ECEF vectors are expressed in meters.)

The angular deviation of the GCP to the reference plane is then given by:

$$\alpha_{lat} = \sin^{-1}\left(\frac{d_{lat}}{|r_{GCP}^{ECEF} - r_{ARP}^{ECEF}|}\right) \quad (16)$$

The vertical deviations use the GPIP as the origin. The angular deviation of the GCP relative to the vertical reference plane can be computed:

$$\alpha_{GS} = \sin^{-1}\left(\frac{d_{GS}}{|r_{GCP}^{ECEF} - r_{GPIP}^{ECEF}|}\right) \quad (17)$$

The purpose of the airplane position assurance monitor (APAM) is to compare angular deviations as computed from GPS/baro position and the deviations as measured by the ILS system. To facilitate this, the computed angular deviation signals must be scaled the same and in the same units as the deviations provided by an ILS receiver at the same location in space. The angular deviation data output must, therefore, be in units of DDM and have a sensitivity (in terms of DDM per degree) as the ILS outputs.

The object is to provide the same azimuth deflection sensitivity for APAM synthesized deviations as that which would be provided by an ILS localizer receiver carried aboard the same aircraft. At most runways, the ILS localizer ground station beam width is adjusted such that the full-scale deflection (0.155 DDM) results in ±350 ft at the runway threshold. The sensitivity of the deviation outputs in degrees per DDM is therefore a function of the distance from the localizer antenna to the runway threshold.

The APAM algorithm must compute deviations relative to a reference origin which is in a location similar to where a localizer array would be. The ARP is defined to be a point in space 1000 ft beyond the far end of the runway on the runway centerline. The distance from the runway threshold (assumed to be the LTP) to the far end of the runway (defined by the FPAP) is computable from data available in the database. Therefore the airplane position assurance monitor should produce horizontal angular deviations referenced to the ARP.

The algorithm should use this information to output a signal having the same deflection sensitivity as an ILS localizer receiver by performing a calculation that determines the correct approach azimuth scale factor which results in the correct approach azimuth full-scale deviation.

The following table shows the range of full-scale display sensitivity for approach azimuth guidance using the LAAS. (Note: these display sensitivities correspond to the display sensitivities for MLS and ILS as defined in ICAO Annex 10 for runways of various lengths.)

TABLE

| ILS Equivalent Horizontal Deviation Output Sensitivity | | | |
|---|---|---|---|
| Runway Class | Distance "D" (GLS ARP to Runway Threshold) | Angular Deflection Sensitivity Scale Factor k | Full-Scale Deflection Sensitivity |
| Heliport | 0-400 meters | k = 0.155/3.6 | ±3.6 degrees |
| Short | 500-1900 meters | k = 0.155/3.0 | ±3.0 degrees |
| Domestic | 2000-4100 meters | $k = \dfrac{0.155}{\tan^{-1}\left(\dfrac{106.7}{D}\right)}$ | ±106.7 m at threshold |
| Intercontinental | 4200-6300 meters | k = 0.155/1.5 | ±1.5 degrees |

The APAM airborne equipment should compute the horizontal deviation outputs in DDMs using the following formula:

$$DDM_H = k \cdot (\text{angular displacement from centerline referenced to ARP}) \quad (18)$$

The scale factor k should be chosen appropriately from the Table using the ARP to Runway Threshold distance D (which is, by definition the runway length plus 1000 ft).

An ILS glide slope station radiates a signal having a nominal approach angle of approximately 3 degrees. The edge of the ILS glide slope sector is defined in ICAO Annex 10 such that edge of path limits are at about ±0.75 degrees from the nominal glide path angle. Specifically, for any arbitrary glide path angle the full-scale (0.175 DDM) indication should occur at ±0.25·(Glide Path Angle).

The APAM airborne equipment should compute the output vertical DDMs using the following formula:

$$DDM_v = \frac{0.175 \cdot \sin^{-1}\left(\frac{d_{GS}}{|u_{long}|}\right)}{0.25 \cdot \Omega} = \frac{0.175 \cdot \Delta\theta}{0.25 \cdot \Omega} \quad (19)$$

where $\Delta\theta$ is the angular deviation of the GCP position relative to the FAS as referenced to the GPIP; and $\Omega$ is the reference angle (i.e., the angle between the FAS reference path and the horizontal plane).

Having computed the synthetic deviations as defined in the sections above, the airplane position assurance monitor simply compares the magnitude of the difference between the computed and observed deviations to a threshold.

$$D_{APAM\_V} = |DDM_V - DDM_{GS}| \quad (20)$$

$$D_{APAM\_H} = |DDM_H - DDM_{LOC}| \quad (21)$$

If $D_{APAM\_V} > T_{APAM\_V}$ or $D_{APAM\_H} > T_{APAM\_H}$, then an alert is issued. In response to this alert, a visible warning can be displayed on a cockpit display. In addition or in the alternative, an audible warning can be generated in the cockpit.

The thresholds $T_{APAM\_V}$ and $T_{APAM\_H}$ need to be set to provide a sufficiently low probability of false alerting, i.e., the probability that $D_{APAM\_V} > T_{APAM\_V}$ or $D_{APAM\_H} > T_{APAM\_H}$ when there is no failure; and a sufficiently low probability of missed detection, i.e., the probability that $D_{APAM\_V} < T_{APAM\_V}$ or $D_{APAM\_H} < T_{APAM\_H}$ when there is a failure. To determine these probabilities, the underlying distribution of errors on DDMs as computed by the APAM as well as the errors on DDMs as measured by the ILS must be examined.

The lateral angular deviations are compared to each other continuously during approach to ensure they fall within required accuracy tolerances. The same is true for the vertical angular deviations. Since the ILS positioning information is monitored and compared continuously, the position assurance of that system is increased sufficiently to potentially allow CAT II approaches to be approved.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention.

For example, instead of using the barometric altitude, the vertical position monitoring could use either an altitude provided by the Satellite-Based Augmentation System or an altitude provided by the Ground-Based Augmentation System or by Radio Altitude corrected with accurate terrain height information.

As used in the claims, the term "computer system" should be construed broadly to encompass a system having at least one computer or processor, and may have two or more interconnected computers or processors.

APPENDIX

Function IIa2ECEF

Function[Xout Yout Zout]=IIa2ECEF([Lat Lon H])

A=6378137.0; % Earth's radius (m)

f=1/298.257223563; % Spheroidal flattening $ESQ=f*(2-f)$; % Eccentricity squared Let:

$SP=\sin(Lat*\pi/180)$;

$CP=\cos(Lat*\pi/180)$;

$SL=\sin(Lon*\pi/180)$;

$CL=\cos(Lon*\pi/180)$;

$GSQ=1.0-(ESQ*SP*SP)$;

$EN=A/\mathrm{sqrt}(GSQ)$;

$Z=(EN+H)*CP$;

$X\mathrm{out}=Z*CL$;

$Y\mathrm{out}=Z*SL$;

$EN=EN-(ESQ*EN)$;

$Z\mathrm{out}=(EN+H)*SP$;

The invention claimed is:

1. A method for monitoring positional accuracy of an airplane approaching a runway, comprising the following steps performed by a computer system during the approach:
   (a) determining a ground distance between a location of the airplane and a touchdown aim point on the runway based on respective coordinates thereof;
   (b) determining a height of the airplane above a threshold of the runway based on an altitude of the airplane and an elevation of a threshold of the runway;
   (c) determining an angle between a hypothetical line extending from the airplane to the touchdown aim point and a perpendicular projection of that line onto a locally level plane that passes through a runway threshold reference point based on the ground distance and the height;
   (d) determining a first vertical angular deviation of the airplane from a glideslope based on a difference of the determined angle and a glide path angle;
   (e) receiving a second vertical angular deviation of the airplane from the glideslope based on measurements of a difference in a depth of modulation of first and second modulated signals transmitted from a ground-based antenna and received by an antenna onboard the airplane;
   (f) comparing the first and second vertical angular deviations; and
   (g) generating an alert signal when the first and second vertical angular deviations differ by an amount greater than a threshold value.

2. The method as recited in claim 1, wherein the airplane location is a location of a control guidance point.

3. The method as recited in claim 1, further comprising determining the coordinates of the airplane location using GPS signals.

4. The method as recited in claim 1, further comprising: measuring a barometric pressure onboard the airplane; and determining the airplane altitude based in part on the measured barometric pressure.

5. The method as recited in claim 1, further comprising determining the altitude of the airplane using GPS signals.

6. The method as recited in claim 1, further comprising: retrieving the glide path angle and a threshold crossing height from a database; and
determining the touchdown aim point based on the glide path angle and the threshold crossing height.

7. A system for monitoring positional accuracy of an airplane approaching a runway, comprising:
   a glideslope receiver for determining a first vertical angular deviation of the airplane from the glide slope based on measurements of a difference in a depth of modulation of first and second modulated signals transmitted by a ground-based glide slope transmitter; and
   a computer system that is programmed to perform the following operations during the approach:
   (a) determining a ground distance between a location of the airplane and a touchdown aim point on the runway based on respective coordinates thereof;
   (b) determining a height of the airplane above a threshold of the runway based on an altitude of the airplane and an elevation of a threshold of the runway;
   (c) determining an angle between a hypothetical line extending from the airplane to the touchdown aim point and a perpendicular projection of that line onto a locally level plane that passes through a runway threshold reference point based on the ground distance and the height;
   (d) determining a second vertical angular deviation of the airplane from a glideslope based on the computed angle and a glide path angle;
   (e) comparing the first and second vertical angular deviations; and
   (f) generating an alert signal when the first and second vertical angular deviations differ by an amount greater than a threshold value.

8. The system as recited in claim 7, further comprising a device that produces an audible or visible warning in response to generation of said alert signal.

9. The system as recited in claim 7, further comprising a pressure altimeter for determining the airplane altitude based on the measured barometric pressure and a navigation database, wherein said computer system is further programmed to retrieve the runway threshold elevation from said navigation database and receive the airplane altitude form said pressure altimeter.

10. The system as recited in claim 7, further comprising a navigation database, wherein said computer system is further programmed to perform the following operations:
   retrieving the glide path angle and a threshold crossing height from said navigation database; and
   determining the touchdown aim point based on the glide path angle and the threshold crossing height.

11. The system as recited in claim 7, wherein said computer system is further programmed to determine the altitude of the airplane using GPS signals.

12. A method for monitoring positional accuracy of an airplane approaching a runway, comprising the following steps performed by a computer system during the approach:
   (a) calculating a ground distance between a location of the airplane and a touchdown aim point on the runway based on respective coordinates thereof and not using vertical angular deviation;
   (b) calculating a height of the airplane above a threshold of the runway based on an altitude of the airplane and an elevation of a threshold of the runway and not using vertical angular deviation;
   (c) calculating an angle between a hypothetical line extending from the airplane to the touchdown aim point and a perpendicular projection of that line onto a locally level plane that passes through a runway threshold reference point based on the ground distance and the height and not using vertical angular deviation;

(d) calculating a first vertical angular deviation of the airplane from a glideslope based on a difference of the calculated angle and a glide path angle;

(e) calculating a second vertical angular deviation of the airplane from the glideslope based on measurements of a difference in a depth of modulation of first and second modulated signals transmitted from a ground-based antenna and received by an antenna onboard the airplane;

(f) comparing the first and second vertical angular deviations; and (g) generating an alert signal when the first and second vertical angular deviations differ by an amount greater than a threshold value.

13. The method as recited in claim 12, further comprising calculating the coordinates of the airplane location using GPS signals.

14. The method as recited in claim 12, further comprising: measuring a barometric pressure onboard the airplane; and calculating the airplane altitude based in part on the measured barometric pressure.

15. The method as recited in claim 12, further comprising calculating the altitude of the airplane using GPS signals.

16. The method as recited in claim 12, further comprising: retrieving the glide path angle and a threshold crossing height from a database; and
calculating the coordinates of the touchdown aim point based on the glide path angle and the threshold crossing height.

* * * * *